United States Patent
Fujimaki et al.

(10) Patent No.: US 8,258,239 B2
(45) Date of Patent: Sep. 4, 2012

(54) PRODUCTION METHOD OF POLYETHYLENE TEREPHTHALATE GRAFT COPOLYMERIZED RESIN AND MOLDED PRODUCT THEREOF

(75) Inventors: Takashi Fujimaki, Yokohama (JP); Yoshitomo Urata, Chigasaki (JP); Hiroshi Shibano, Yokohama (JP)

(73) Assignee: Ftex, Incorporated, Kanagawa (JP)

( * ) Notice: Subject to any disclaimer, the term of this patent is extended or adjusted under 35 U.S.C. 154(b) by 361 days.

(21) Appl. No.: 12/667,312

(22) PCT Filed: Dec. 28, 2007

(86) PCT No.: PCT/JP2007/075307
§ 371 (c)(1),
(2), (4) Date: Dec. 30, 2009

(87) PCT Pub. No.: WO2009/004745
PCT Pub. Date: Jan. 8, 2009

(65) Prior Publication Data
US 2010/0201015 A1  Aug. 12, 2010

(30) Foreign Application Priority Data
Jul. 1, 2007  (JP) ................. 2007-198120

(51) Int. Cl.
*C08L 67/03*  (2006.01)
(52) U.S. Cl. ........................ 525/176; 525/438
(58) Field of Classification Search .......... None
See application file for complete search history.

(56) References Cited

U.S. PATENT DOCUMENTS

| | | | |
|---|---|---|---|
| 4,984,694 A | 1/1991 | Magnusson | |
| 6,214,269 B1 * | 4/2001 | Fujita et al. | 264/176.1 |
| 6,506,852 B2 | 1/2003 | Yoshimura et al. | |
| 7,993,569 B2 * | 8/2011 | Kobayashi et al. | 264/553 |
| 2002/0035218 A1 | 3/2002 | Yoshimura et al. | |
| 2003/0135015 A1 | 7/2003 | Fujimaki et al. | |

FOREIGN PATENT DOCUMENTS

| | | | |
|---|---|---|---|
| JP | 02-058560 A | | 2/1990 |
| JP | 2-58560 A | * | 2/1990 |
| JP | 2003-55483 A | * | 2/2003 |
| JP | 2004-250711 A | * | 9/2004 |
| JP | 2005-105059 A | | 4/2005 |
| JP | 2005-517061 A | | 6/2005 |
| JP | 2005-248160 A | * | 9/2005 |
| JP | 2006-176711 A | * | 7/2006 |
| JP | 2008-031482 A | | 2/2008 |
| WO | 98/44019 A1 | | 10/1998 |
| WO | 01/94443 A1 | | 12/2001 |
| WO | WO 2006068193 a1 | | 6/2006 |

* cited by examiner

*Primary Examiner* — Robert Sellers
(74) *Attorney, Agent, or Firm* — Sughrue Mion, PLLC

(57) ABSTRACT

The present invention provides a method of producing a polyethylene terephthalate graft copolymerized resin, comprising subjecting the following mixture to a homogeneous reaction at a temperature of 250° C. or higher to impart a high melt viscosity to the mixture, the mixture containing (A) 100 parts by weight of a polyethylene terephthalate polyester as a main material, (B) 0.01 to 2 parts by weight of a polymeric polyfunctional epoxy compound containing 7 to 100 epoxy groups in a molecule and having a molecular weight of 1,000 to 300,000 as a coupling agent, (C) 0.01 to 1 part by weight of a metal salt of an organic acid as a coupling reaction catalyst, and (D) 0 to 100 parts by weight of an aromatic alicyclic polyester and/or an aromatic aliphatic polyester each having a carboxyl group in an aromatic nucleus as an auxiliary material.

10 Claims, No Drawings

PRODUCTION METHOD OF POLYETHYLENE TEREPHTHALATE GRAFT COPOLYMERIZED RESIN AND MOLDED PRODUCT THEREOF

TECHNICAL FIELD

The present invention relates to a method of producing a polyethylene terephthalate graft copolymerized resin, including: adding aromatic alicyclic and aromatic aliphatic polyesters as auxiliary materials and a modifier formed of a polymeric polyfunctional epoxy coupling agent and an organic acid catalyst to a polyethylene terephthalate (hereinafter may be abbreviated as PET) resin. The mixture is subjected to a coupling reaction, whereby, in the polyethylene terephthalate graft copolymerized resin, the molecular weight and the melt viscosity are increased and an expansion control of a molecular weight distribution is performed to a large extent. Hence, landmark improvements are made in the molding processability and the resin physical properties of the resin to be produced.

More specifically, the present invention relates to providing a method of producing a polyethylene terephthalate graft copolymerized resin, including: adding a modifier formed of a polymeric polyfunctional epoxy coupling agent and an organic acid catalyst to a low-molecular-weight PET resin after polycondensation, a middle- to high-molecular weight PET resin after solid phase polymerization, or a PET resin molded product which is obtained by molding the PET resins, collected after its molecular weight and physical properties are lowered, and aromatic alicyclic and aromatic aliphatic polyesters each having a carboxyl group in an aromatic nucleus; and subjecting the mixture to a homogeneous reaction with a reactive extrusion method for a long period of time. As a result, gelling or fish eyes are not by-produced in the polyethylene terephthalate graft copolymerized resin, and, the molecular weight and the melt viscosity are increased, and expansion control of the molecular weight distribution is performed to a large extent. Hence, landmark improvements in the molding processability and the resin physical properties, which have been extremely difficult to achieve in the conventional PET, are made.

BACKGROUND ART

A conventional aromatic saturated polyester has excellent physical properties as a thermoplastic resin, such as polyethylene terephthalate (PET), polybutylene terephthalate (PBT), or polyethylene-2,6-naphthalene dicarboxylate (PEN), and is used in a wide range of products as fibers, films, plastics, and the like. In the plastic field, a molded product thereof is widely employed for bottles, sheets, containers, daily commodities, automobiles, machinery parts, electronic and electric materials, building materials, various industrial goods, or the like.

In recent years, from the viewpoint of resource saving and environmental conservation, the need for recycling used plastic products collected from factory production processes or a general consumer market has been globally recognized. In particular, the recovery and recycling of used PET bottles, films, and the like is being actively promoted. Polyethylene terephthalate contains, in addition to terephthalic acid, a small amount of isophthalic acid. Further, a polyester containing cyclohexane dimethanol such as PETG is also mixed in polyethylene terephthalate in recent years. Therefore, the polyethylene terephthalate herein is collectively referred to as PET polyester. In the crystalline PET polyester, a large drop in the molecular weight occurs when the polyester undergoes heat history in the course of molding processing, due to autohydrolysis caused by trace amounts of water contained in the polyester. At that time, the number of free carboxyl groups at a molecular terminal increases due to the cleavage of ester bonds, and a by-product of acetaldehyde by the thermal decomposition is practical problem, which has been a drawback to the development of recycling technologies for the collected bottles and sheets. The molecular weight of a used PET bottle that has been collected is reduced compared with brand-new pellets, for example, the molecular weight of the flakes (crushed products) of the collected PET bottles which are produced in a large amount is reduced to about one half. Accordingly, when the flakes of the collected PET bottles are recycled as a main material resin, the molding processability is poor, the flakes cannot be formed into the original PET bottle and can only be formed into filaments, sheets for an egg containers, and the like, which can be formed with the flakes having low molecular weight. Hence, the recycling applications of the flakes of collected PET bottles have been limited to a narrow range usage.

As methods to solve the above problems, there are known: a method of restoring the molecular weight by a solid phase polymerization of PET polyester; a method of reacting a chain extender with a hydroxyl group or a carboxylic group of a polyester terminal group; a method of adding another resin such as an elastomer to support mechanical properties; and the like.

As the chain extender, practical applications of compounds having functional groups such as isocyanate, oxazoline, epoxy, aziridine, and carbodiimide have been proposed. However, practical compounds are limited because of strict restrictions in reactivity, heat resistance, safety, stability, and the like.

Of these, an epoxy compound is relatively useful, and a blend of a monoepoxy compound (Patent Document 1), a blend of a diepoxy compound (Patent Document 2, Patent Document 3, and Patent Document 4), and the like have been disclosed. However, there have been various problems in reaction rate, by-production of gel, melt viscosity, compatibility, heat stability, physical properties of the molded product, and the like.

On the other hand, a method of increasing the molecular weight of polyester by mixing and melting the collected PET polyester with a bifunctional epoxy resin and a steric hindrance type hydroxyphenyl alkyl phosphonate has been proposed (Patent Document 5). This method may provide a relatively fast reaction rate, but the resin produced is in a linear structure, which is the same as the conventional PET, and hence, the increase in melt viscosity of the resin is small and the improvement effect of the molding processability is small. Further, the steric hindrance type hydroxyphenyl alkyl phosphonate to be used is expensive, and there is a problem with practical use in industry where low recovery and recycling costs are required. Further, there has also been proposed a method of blending a rubber or an elastomer with the polyester, but in such case, there have been difficulties in compatibility, heat resistance, elastic modulus, and the like.

The inventors of the present invention have previously proposed a method of adding a mixed epoxy resin of bifunctional epoxy resin and a trifunctional epoxy resin (low-molecular-weight liquid) and an organic acid metal salt catalyst to PET polyester and mixing and melting the mixture with a reactive extrusion method so that the resultant is formed into a long chain branched structure and the molecular weight of PET polyester is increased in a short period of time (Patent Document 6). After that, however, in the practical use of, in particular, a film, there has arisen a problem of by-production of gelling or fish eyes (FE) attributed to a heterogeneous local reaction in the course of a high-speed coupling reaction within several minutes.

Subsequently, a method of performing a homogeneous reaction using a masterbatch in which a mixed epoxy resin (low-molecular-weight liquid) of bifunctional epoxy resin and a trifunctional epoxy resin and an organic acid metal salt catalyst are diluted about 10-fold with PET polyester has been proposed (Patent Document 7). The method has improved to a large extent the by-production of gelling or fish eyes (FE) in the course of a high-speed coupling reaction within several minutes. In the masterbach method, however, it is difficult, in principle, to homogeneously mix a trace amount of the epoxy resin of low viscous liquid into the highly viscous resin inside a reactive extruder, and hence, there is needed an expensive reactive extruder having extremely specific structure for practical use. Further, in a long-term operation for several days or more, by-production of trace amounts of gel or fish eyes (FE) tends to increase with time due to the following reasons: degree of reaction completion is not uniform and hence the melt viscosity (MFR) of the pellets fluctuates; and a modifier is deposited in and adhered to the grooves of the screw.

Patent Document 1: JP 57-161124 A
Patent Document 2: JP 07-166419 A
Patent Document 3: JP 48-25074 B
Patent Document 4: JP 60-35944 B
Patent Document 5: JP 08-508776 A
Patent Document 6: JP 3503952 B
Patent Document 7: WO 2001/094443

DISCLOSURE OF THE INVENTION

Problems to be Solved by the Invention

The present invention aimed at providing, in order to fundamentally improve a PET polyester resin having relatively low molecular weight as a main material, a method of producing a PET polyester resin, in which, at the time of producing a PET resin by adding aromatic alicyclic and aromatic aliphatic polyesters as auxiliary materials and a modifier formed of a coupling agent and a catalyst to the resin and subjecting the mixture to a reaction with a reactive extrusion method for a short period of time of several minutes to thereby increase molecular weight and melt viscosity and to thereby expand molecular weight distribution to a large extent: gelling or fisheyes (FE) are not by-produced due to the homogeneous coupling reaction even when the mixture is reacted for a long period of time; and landmark improvements in the molding processability and the resin physical properties are made.

Means for Solving the Problems

The inventors of the present invention have conducted intensive studies in order to solve the above problems, and have found that the above object can be attained industrially advantageously with the following method. That is, there is provided a method in which, at the time of producing a PET resin by adding aromatic alicyclic and aromatic aliphatic polyesters as auxiliary materials and a modifier formed of a coupling agent and a catalyst to a PET polyester resin having relatively low molecular weight as a main material and subjecting the mixture to a reaction with a reactive extrusion method to thereby increase molecular weight and melt viscosity: gelling or fish eyes (FE) are not by-produced even when the mixture is subjected to a homogeneous coupling reaction for a long period of time; a landmark improvement in the molding processability is made compared to the molding processability of a conventional bifunctional to trifunctional (hexafunctional at maximum) mixed epoxy resin-based binder of a low-molecular-weight liquid; and a significant improvement in the resin physical properties is made by using aromatic alicyclic and aromatic aliphatic polyesters in combination. The above method is attained by using polyfunctional epoxy coupling agents of high-molecular weight solids and a mixture thereof instead of the bifunctional to trifunctional (for example, hexafunctional at maximum as epoxidized linseed oil) mixed epoxy resin-based coupling agent of the low-molecular-weight liquid used in a conventional method. Thus, the present invention has been achieved.

Further, the inventors of the present invention have found that, particularly when a trace amount of the modifier of the present invention is used, the modifier functions as a crystal nucleating agent for PET resins, sheets (thickness of 1 mm or less), and boards (thickness of 1 mm or more). Thus, further expanding the application of the present invention has been further expanded.

First, the present invention provides a method of producing a polyethylene terephthalate graft copolymerized resin, comprising: subjecting a mixture containing (A) 100 parts by weight of a polyethylene terephthalate polyester as a main material, (B) 0.01 to 2 parts by weight of a polymeric polyfunctional epoxy compound containing 7 to 100 epoxy groups in a molecule and having a molecular weight of 1,000 to 300,000 as a coupling agent, (C) 0.01 to 1 part by weight of a metal salt of an organic acid as a coupling reaction catalyst, and (D) 0 to 100 parts by weight of an aromatic alicyclic polyester and/or an aromatic aliphatic polyester each having a carboxyl group in an aromatic nucleus as an auxiliary material to a homogeneous reaction at temperature of 250° C. or higher to impart a high melt viscosity to the mixture.

Second, the present invention provides a method of producing a polyethylene terephthalate graft copolymerized resin, comprising: subjecting a mixture containing (A) 100 parts by weight of a polyethylene terephthalate polyester as a main material, (B) 0.01 to 2 parts by weight of a polymeric polyfunctional epoxy compound containing 7 to 100 epoxy groups in a molecule and having a molecular weight of 1,000 to 300,000 as a binder, (C) 0.01 to 1 part by weight of a metal salt of an organic acid as a coupling reaction catalyst, and (D) 0 to 100 parts by weight of an aromatic alicyclic polyester and/or an aromatic aliphatic polyester having a carboxyl group in an aromatic nucleus as an auxiliary material to a homogeneous reaction by a reactive extrusion method at temperature of 250° C. or higher to set an MFR of the mixture in accordance with a JIS method at 280° C. and under a load of 2.16 kg to 50 g/10 min or less.

Third, the present invention provides a method of producing a polyethylene terephthalate graft copolymerized resin according to the above items, wherein (A) the polyethylene terephthalate polyester as a main material contains one or more kinds chosen from polyethylene terephthalate having an intrinsic viscosity of 0.60 to 1.25 dl/g and a recycled product of a collected polyethylene terephthalate molded product.

Fourth, the present invention provides a method of producing a polyethylene terephthalate graft copolymerized resin, wherein two or more kinds of (B) the polymeric polyfunctional epoxy compounds each containing 7 to 100 epoxy groups in a molecule and having a molecular weight of 1,000 to 300,000 as coupling agent are used in combination to perform an expansion control of a molecular weight distribution.

Fifth, the present invention provides a method of producing a polyethylene terephthalate graft copolymerized resin, wherein (C) the metal salt of an organic acid as a coupling reaction catalyst contains one or more kinds chosen from the group consisting of a carboxylate of an alkali metal and a carboxylate of an alkaline earth metal.

Sixth, the present invention provides a method of producing a polyethylene terephthalate graft copolymerized resin, wherein (D) the aromatic alicyclic polyester and/or the aromatic aliphatic polyester each having a carboxyl group in an aromatic nucleus contains one or more kinds selected from the group consisting of amorphous ethylene glycol/cyclohexanedimethanol/terephthalate, a polyester elastomer, and a crystalline polybutylene terephthalate.

Seventh, the present invention provides a method of producing a molded product of a polyethylene terephthalate graft copolymerized resin, comprising: subjecting a mixture to a homogeneous reaction by a reactive extrusion method at temperature of 250° C. or higher to produce a polyethylene terephthalate graft copolymerized resin, the mixture containing (A) 100 parts by weight of a polyethylene terephthalate polyester as a main material, (B) 0.01 to 0.5 part by weight of a polymeric polyfunctional epoxy compound containing 7 to 100 epoxy groups in a molecule and having a molecular weight of 1,000 to 300,000 as a coupling agent, and (C) 0.01 to 0.3 part by weight of a metal salt of an organic acid as a coupling reaction catalyst; and molding the polyethylene terephthalate graft copolymerized resin into a film, a sheet, or a board.

Eighth, the present invention provides a method of producing a foamed product of a polyethylene terephthalate graft copolymerized resin, comprising: subjecting a mixture to a homogeneous reaction by a reactive extrusion method at temperature of 250° C. or higher to produce a polyethylene terephthalate graft copolymerized resin, the mixture containing (A) 100 parts by weight of a polyethylene terephthalate polyester as a main material, (B) 0.5 to 2 parts by weight of a polymeric polyfunctional epoxy compound containing 7 to 100 epoxy groups in a molecule and having a molecular weight of 1,000 to 300,000 as a binder, (C) 0.01 to 0.3 part by weight of a metal salt of an organic acid as a coupling reaction catalyst, and (D) 0 to 100 parts by weight of an aromatic alicyclic polyester and/or an aromatic aliphatic polyester each having a carboxyl group in an aromatic nucleus as an auxiliary material; and foam-molding the polyethylene terephthalate graft copolymerized resin using a foaming gas containing one or more kinds selected from the group consisting of a chemical foaming agent gas, a volatile gas, and an inert gas.

Effects of the Invention

According to the present invention, it has become possible to produce the PET polyester resin in which, at the time of producing a PET resin by adding aromatic alicyclic and aromatic aliphatic polyesters as auxiliary materials and a modifier formed of a polymeric polyfunctional epoxy coupling agent and a catalyst to a PET polyester resin having relatively low molecular weight as a main material and subjecting the mixture to a reaction with a reactive extrusion method to thereby increase the molecular weight and melt viscosity and to thereby expand a molecular weight distribution to a large extent: gelling or fish eyes (FE) is not by-produced even when the mixture is subjected to a homogeneous coupling reaction for a long period of time; and landmark improvements in the molding processability and the resin physical properties, which have been extremely difficult to achieve in the conventional PET, are made. The above PET polyester resin is attained by using polyfunctional (functional number of 7 to 100) epoxy coupling agents of polymer solids and a mixture thereof, which is different from the bifunctional to trifunctional (hexafunctional at maximum) mixed epoxy resin-based coupling agent of the low-molecular-weight liquid used in a conventional method. That is, according to the present invention: it has become easier to perform film molding by an tubular film method, multi-layer film molding by a lamination method, foam molding by an extrusion method, pipe molding, and profile extrusion molding; and further, it has become possible to produce an adhesive film for o-PET and a high-speed crystalline sheet and board.

BEST MODE FOR CARRYING OUT THE INVENTION

Hereinafter, the present invention is described in detail.
(Polyethylene Terephthalate Polyester)

A polyethylene terephthalate polyester, which is component (A) used as a main material in the present invention, is synthesized from a dicarboxylic acid component and a glycol component. As the dicarboxylic acid component, exemplified are aromatic or alicyclic dicarboxylic acids such as terephthalic acid, isophthalic acid, naphthalene dicarboxylic acid, and cyclohexane dicarboxylic acid. Of those, aromatic dicarboxylic acids are preferable, and terephthalic acid, isophthalic acid, and 2-6-naphthalene dicarboxylic acid are particularly preferable.

As the glycol component, exemplified are ethylene glycol, trimethylene glycol, tetramethylene glycol, hexamethylene glycol, and cyclohexanedimethanol. Of those, ethylene glycol is preferable.

Specific examples of the PET polyester to which the present invention may be applied include polyethylene terephthalate (PET), a low-melting-point PET having a small amount of isophthalate copolymerized therein, polyethylene-2,6-naphthalate (PEN), and the like. Of those, polyethylene terephthalate (PET) is particularly preferable.

An intrinsic viscosity of the PET polyester to be used in the present invention is, when measured by being dissolved into a 1,1,2,2-tetrachloroethane/phenol (1:1) mixed solvent at 25° C., preferably 0.60 dl/g or more and more preferably 0.70 dl/g or more. When the intrinsic viscosity is less than 0.60 dl/g, it is difficult to increase molecular weight of the resin even by the present invention, and the polyester resin to be obtained may not achieve excellent mechanical strength. The upper limit of the intrinsic viscosity is not particularly limited, and is generally 0.90 dl/g or less and preferably 0.80 dl/g or less, which is relatively inexpensive. The upper limit of the intrinsic viscosity of commercially-available PET is 1.25 dl/g. However, the single use thereof deteriorates the molding processability, and hence, in the present invention, it is particularly preferred that the above PET be used in a mixture with one having an intrinsic viscosity of 0.60 to 0.80 dl/g. This is because the use of the mixture allows the molecular weight distribution to be expanded to a large extent, and as a result, various molding methods can be put into practical use for the first time. For example, the mixing ratio is preferably as follows: 5 to 25 parts of PET for bottles and sheets (intrinsic viscosity: 0.75 to 0.85 dl/g) and 5 to 25 parts of high-molecular weight PET (intrinsic viscosity: 0.85 to 1.25 dl/g) are added to 100 parts of collected PET bottles (intrinsic viscosity: 0.70 to 0.75 dl/g).

In cases where a recycled products of PET polyester is used, generally, an intrinsic viscosity of the recycled product is lower than an intrinsic viscosity which a molded product of the recycled product had previously, and the intrinsic viscosity is generally about 0.60 to 0.80 dl/g and in particular about 0.65 to 0.75 dl/g. In the case where a molded product of the recycled PET polyester is used, the form of the molded product may be any of crushed product of bottles, films, or sheets, or other molded products. Further, even if a small amount of other polymers such as polyolefin, and polyacrylate is included in the polyester, the reactive extrusion method of the present invention will not be affected. Further, the recycled product may contain a small amount of additives such as fillers, and pigments, and dye may also be used if the application thereof is selected. In particular, PET bottles are preferable as the polyester as a raw material of the present invention, because the social environment for collecting and recycling the PET bottles is being developed and besides, polyester used for the PET bottles has a suitable composition for reuse.

Polymeric Polyfunctional Coupling Agent

The coupling agent as a component (B) of the present invention has a molecular weight of 1,000 to 300,000, and a polymeric polyfunctional epoxy compound containing 7 to 100 epoxy groups in the molecule can be used alone or two or more kinds thereof can be used as a mixture. Examples of commercially-available products, in which an epoxy ring-containing glycidyl group is suspended on a polymeric resin like a pendant, or an epoxy group is contained in the molecule, include: "MODIPER" A series, "NOFALLOY" IE series, "BLEMMER", "Falpack", and "Marproof" series manufactured by NOF CORPORATION; "Epofriend" series manufactured by DAICEL CHEMICAL INDUSTRIES, LTD.; and "Bondfast" manufactured by Sumitomo Chemical Co., Ltd.

The resin forming a skeleton of a polymeric polyfunctional epoxy compound includes mainly acrylic resins and polystyrene resins and copolymers thereof are also used. However, an acrylic resin is preferred over the polyolefins (PP, PS, PE). This is because the solubility parameters of the resins are as follows: main raw material PET: 10.7; an epoxy resin: 10.8; polymethyl acrylate: 10.2; polyethyl acrylate: 9.4; polypropylene (PP): 9.3; polyethyl methacrylate: 9.0; polystyrene (PS): 8.9; and polyethylene (PE): 8.0, and the nearer the value are to each other, the better they mix together. It should be noted that when polyolefins are each mixed even in amounts of 1 to 2%, they cause film sheets of PET resin to cloud, and hence polyolefins are not suitable in cases where the molded product requires transparency. However, because foamed bodies, pipes, and high heat-resistant containers are white in color, polyolefins can be used in applications where transparency is not required.

The inventors of the present invention have used, in the conventional method, a compound which contains 2 to 3 or 4 to 6 epoxy groups in the molecule. As typical examples of the compound which contains 2 epoxy groups in the molecule, aliphatic ethylene glycol/diglycidyl ether (molecular weight: 174, epoxy equivalent: 135 g/eq., number of functional groups: 2 groups/molecule) and aromatic bisphenol A-diglycidyl ether (molecular weight: about 1,000, epoxy equivalent: 135 g/eq., number of functional groups: 2 groups/molecule) have been given.

Further, as a typical example of a compound which contains 3 epoxy groups in the molecule on average, trimethylolpropane-triglydicyl ether (molecular weight: 288, epoxy equivalent: 150 g/eq., number of functional groups: 3 groups/molecule) has been given. Still further, as typical examples of a polyfunctional compound which contains 3 or more epoxy groups in the molecule on average, epoxidized soybean oil (molecular weight: about 1,000, epoxy equivalent: 232 g/eq., number of functional groups: 4 groups/molecule) and epoxidized linseed oil (molecular weight: about 1,000, epoxy equivalent: 176 g/eq., number of functional groups: 6 groups/molecule) have been given.

PET having, for example, an intrinsic viscosity (IV value) of 0.7 dl/g has a number average molecular weight of about 12,000, which is small in absolute molecular weight, and a molecular weight distribution Mw/Mn of 2 to 3, which is extremely small. Therefore, the molecular weight of the product obtained by the coupling reaction according to the conventional method has been 24,000 (bifunctional), 36,000 (trifunctional), or 72,000 (hexafunctional) at most. On the other hand, the polyolefin resin has a number average molecular weight of 100,000 to 1,000,000, which is large, and a molecular weight distribution Mw/Mn of 5 to 20, which is extremely large. Metaphorically speaking, the molecular weight distribution of PET has an Eiffel tower shape, while the molecular weight distribution of the polyolefin resin has a Mt. Fuji-shape. Therefore, in regard to molding processability, the former is difficult to be molded and the latter is remarkably easily molded.

The greatest feature of the present invention is to provide a method of producing a polyethylene terephthalate graft copolymerized resin containing a reaction product which, like polyolefin resin, has a large number average molecular weight of 100,000 to 1,000,000 and an extremely large molecular weight distribution, by using a polymeric polyfunctional epoxy compound alone or a mixture of two or more kinds thereof. Thus, the molding processability of a PET polyester is remarkably facilitated just as that of the polyolefin resin.

The expansion control of the molecular weight distribution of the present invention can be performed by using, as a polymeric polyfunctional epoxy compound (B), a mixture containing 100% of a compound having presumably about 17 epoxy groups in a molecule whose weight average molecular weight is about 10,000 (BLEMMER CP-30S manufactured by NOF CORPORATION, molecular weight 9,000), 50% of a compound having presumably about 32 epoxy groups in a molecule (BLEMMER CP-50M manufactured by NOF CORPORATION, molecular weight 10,000), and 25% of a compound having presumably about 71 epoxy groups in a molecule (Marproof G-01100 manufactured by NOF CORPORATION, molecular weight 12,000), for example, thereby producing a graft copolymer having a molecular weight of about 180,000 (CP-30S, 0.9+1×17=179,000, the same calculation below), a molecular weight of about 330,000 (CP-50M, 1+1×32=330,000), or a molecular weight of about 720,000 (G-01100, 1.2+1×71=722,000) from the main material PET having a molecular weight of 10,000 (IV: 0.68 to 0.73) depending on the charging ratio and the blending amount of the compound. It should be noted that, although polyolefin resins have a linear structure, the product of the present invention is a graft copolymer, thus, a resin model differs from polyolefin resins.

In general, the PET polyester is synthesized so as to have hydroxyl groups (about 10 mg KOH/g resin) at both ends, but in practice, the PET polyester has a small amount of an aromatic carboxylic group (about 2 to 50 mg KOH/g resin) at one end, which conducts coupling reaction with an epoxy compound by using a catalyst. Accordingly, the image model of the product of the present invention is presumed to have a state as follows: in the sea of the unreacted product (hydroxyl groups at both ends do no react) of the main material PET having a molecular weight of 10,000 (IV 0.68 to 0.73), islands of chestnut bur-like or comb-like graft copolymers each having a molecular weight of about 180,000, about 330,000, or about 720,000 are dispersed in a small amount depending on the charging ratio of each of the graft copolymers.

The blending amount of the polymeric polyfunctional epoxy compound serving as the component (B) as a coupling agent is 0.01 to 2 parts by weight with respect to 100 parts by weight of the PET polyester serving as the component (A) as a main material. For application as tubular film, foamed products, and pipes, in which the molecular weights and the melt viscosities of the PET polyester (A) as a main material and the polyester (D) as an auxiliary material need to be increased, the blending amount is preferably 0.5 to 2 parts by weight and particularly preferably 0.6 to 1.5 parts by weight. When the blending amount is less than 0.5 parts by weight, the effects for increasing the molecular weight and the melt viscosity are insufficient, which causes inadequate molding processability and therefore the basic physical properties and the mechanical properties of the molded product become poor. When the blending amount exceeds 2 parts by weight, the molding processability deteriorates conversely, yellow discoloration or coloring of the resin occurs, and by-products such as gelling and FE are generated.

On the other hand, in the case where the polymeric polyfunctional epoxy compound as the component (B) serving as a coupling agent is used as a "nucleus agent for crystallization" of sheet and board for a particular application, the blending amount is as follows: 0.01 to 0.5 part by weight of the polymeric polyfunctional epoxy compound (B) is used with 0.01 to 0.3 part by weight of the coupling reaction catalyst (C) with respect to 100 parts by weight of polyethylene terephthalate polyester (A). When the blending amount of the polymeric polyfunctional epoxy compound is 0.01 part by weight or less, the crystallization rate of the sheet and board is slow, and when the blending amount is 0.5 part by weight or more, the transparency of the sheet is deteriorated. In this case the blending amount of (B) is preferably from 0.05 to 0.2 and (C) is from 0.05 to 0.15 parts by weight respectively.

In the present invention, in general, the melt tension and the tension viscosity of the PET polyester (A) as a main material and polyester (D) as an auxiliary material increase as the blending amount of the polymeric polyfunctional epoxy compound (B) as a coupling agent increases, and in general, the molding processability is improved. Further, the crystallization rate of the PET polyester resin increases, because the polymeric polyfunctional epoxy compound and a carboxylic acid metal salt catalyst each function as a "nucleus agent forming molecule-size crystal". An effect of molding processability includes improvement in productivity owing to, for example, the injection molding cycle being shortened. In tubular film molding, bubbles become stable and the uneven thickness of the film decreases. In T-die film molding, horizontal extrusion becomes possible, neck-in decreases, and the yield of the film improves. In the extrusion molding of a sheet and a board, draw down properties are improved and stable molding becomes possible. Further, in a vacuum pressure thermo-forming method, the crystallization rate of the sheet and board is fast, and hence, a high-cycle molding processing can be easily performed. In particular, in the PET polyester resin having large swell and melt tension, foam molding can be easily performed. Because it is possible to perform a horizontal extrusion, pipe molding and profile extrusion molding can be performed.

The main characteristics of the resin production according to the reactive extrusion method of the present invention are that: the mixing property inside the extruder is particularly improved, because the melt viscosity of the PET (A) as a main material and the auxiliary material (D) and the melt viscosity of the polymeric polyfunctional epoxy "solid" are approximately the same; yellow discoloration or coloring and generation of by-products such as gelling and FE, which have been the problems when using low-molecular-weight epoxy "liquid" according to the conventional method, are not caused anymore; and the screw and cylinder is barely contaminated. Hence, it becomes possible to perform continuous operation with the reactive extrusion method for a long period of time.

Coupling Reaction Catalyst

The coupling reaction catalyst as the component (C) in the present invention is a catalyst including at least one or more kinds selected from the group consisting of (1) an organic acid salt of an alkali metal, a carbonate of an alkali metal, and a bicarbonate of an alkali metal, (2) an organic acid salt of an alkaline earth metal, and (3) an organic acid salt of aluminum, zinc, or manganese. As the organic acid salt, carboxylate, acetate, or the like can be used, and stearate is particularly preferable out of carboxylates. As the metal forming metal salts of carboxylic acid, alkali metals such as lithium, sodium, and potassium; and alkaline earth metals such as magnesium, calcium, strontium, and barium can be used.

The blending amount of the carboxylate as the coupling reaction catalyst is 0.01 to 1 part by weight with respect to 100 parts by weight of the PET polyester as the component (A). A blending amount 0.1 to 0.5 part by weight is particularly preferable. When the blending amount is less than 0.01 parts by weight, the catalyst effect is small, and thus the reaction is not completed and the molecular weight may not increase sufficiently. When the blending amount exceeds 1 part by weight, gel generation due to a local reaction or a rapid increase in the melt viscosity due to promotion of hydrolysis occurs, which causes troubles inside an extrusion molding machine and the like.

Aromatic Alicyclic Polyester and Aromatic Aliphatic Polyester Each Having Carboxyl Group in Aromatic Nucleus In the present invention, the aromatic alicyclic polyester and the aromatic aliphatic polyester each having a carboxyl group in an aromatic nucleus, which are used as auxiliary materials, contain one or more kinds selected from the group consisting of an amorphous ethylene glycol/cyclohexanedimethanol/terephthalate (copolyester manufactured by Eastman Chemical Company, trade name: Eastar PETG 6763), a polyester elastomer, a crystalline polybutylene terephthalate (PBT), a PET like polyester having a melting point of 220° C. or lower (e.g., Vylon and the like manufactured by TOYOBO CO., LTD.). When the melting point of the PET like polyester exceeds 220° C., the melting point of the PET like polyester approaches the melting point of the PET resin of 250° C., and hence, the addition effect, improving effects of film adhesion and molding processability, and the like are deteriorated. As the polyester elastomer, there can be used commercial products such as NUBELAN manufactured by TEIJIN CHEMICALS LTD., Hytrel manufactured by DU PONT-TORAY CO., LTD., PELPRENE series manufactured by TOYOBO CO., LTD., and PRIMALLOY manufactured by Mitsubishi Chemical Corporation.

A modified product formed only of the PET resin contains approximately 99% of PET as a main material, and hence has approximately the same physical properties as those of commercial PET. Therefore, the development of novel applications of the modified product, such as tubular film, adhesive film, fusion-cut shrink film, foamed products, and pipes, becomes difficult.

A copolymerization with the auxiliary material of the present invention enables the development of a novel application. For the improvement in the PET resin: the polyester of amorphous ethylene glycol/cyclohexanedimethanol/terephthalic acid (PETG) contributes to, for example, the molding processability and transparency of an tubular film and the shrinking property of a fusion-cut shrink film; the polyester elastomer contributes to, for example, the adhesion of an adhesive film, the impact resistance of a container, a foamed body, and a pipe, and the transparency and the flexibility of an tubular film; and the crystalline polybutylene terephthalate (PBT) contributes to, for example, the promotion of recrystallization during the molding of containers, foamed products, pipes, and the like, and in particular, in the case of producing a molded product having an expansion ratio of three times or more, PBT functions as a core material which promotes the recrystallization inside the foamed body and can prevent the compression deformation of the foamed product caused by a cooling roll.

The blending amount of the aromatic alicyclic polyester and the aromatic aliphatic polyester each having a carboxyl group in an aromatic nucleus as the component (D) is 0 to 100 parts by weight and preferably 2 to 80 parts by weight with respect to 100 parts by weight of the PET polyester as the component (A). The blending amounts are selected depending on application. For example, there can be used 10 to 50 parts by weight of PETG and 1 to 30 parts by weight of the polyester elastomer for the adhesive film and the foamed product. A part of the examples are shown in the following examples, but the present invention is not limited thereto.

In the polyester resin composition of the present invention, other than the polyester as the above component (A), the epoxy group-containing compound as the above component (B), the catalyst as the above component (C), and the aromatic alicyclic polyester and an aromatic aliphatic polyester, in both of which a carboxyl group is included in the aromatic nucleus, as the component (D), the following may be arbitrarily compounded: spreaders, lubricants, antioxidants, stabilizers, UV absorbers, colorants, viscosity modifiers, antistatic agents, conductive agents, flowability-imparting agents, releasing agents, filler such as talc, calcium carbonate, calcium oxide, kaolin, alumina, and aluminum hydroxide, reinforcement material such as glass fiber, carbon fiber, aramid fiber, whiskers, and pigments such as carbon black, antimony oxide, molybdenum disulfide, and titanium oxide.

Blending Method, and Coupling Reaction by Reactive Extrusion Method

The present invention has another characteristic in that the invention is performed by a reactive extrusion method. An extrusion apparatus is generally used for the purpose of mixing a resin, filler, and the like. However, in recent years, research and development have been conducted for performing a chemical reaction inside the extrusion apparatus. In the present invention, the coupling reaction is performed inside the extrusion apparatus. In general, the production of the macromolecularized polyester resin is only achieved after a dozen hours or so by undergoing a polycondensation reaction and a solid phase reaction. On the other hand, according to the reactive extrusion method of the present invention, the modification to the macromolecularized resin inside the extrusion apparatus is achieved at a high rate in about 1 to 10 minutes.

First, a method of blending the polyester resin of the present invention is described. A PET polyester as the component (A), there may be used in any arbitrary form, such as ordinary virgin chips, recycled flakes, a granular substance, powder, or chips. Whether or not the PET polyester is dried is also optional. In general, the PET polyester as a main component is preferably dried. Further, the same applies to the aromatic alicyclic and aromatic aliphatic polyesters as the component (D). After the respective components are mixed in a mixing machine such as a tumbler or a Henschel mixer, the mixture is supplied into an extrusion apparatus. The temperature at which the mixture is heat-melted is desirably 250° C. (melting point of polyester) or higher and 300° C. or lower from the viewpoint of the reactive extrusion method. In particular, the temperature is preferably 280° C. or lower and particularly preferably 265° C. When the temperature exceeds 300° C., discoloration or thermal decomposition of the polyester may occur. In addition to the method involving mixing the respective components simultaneously, it is also possible to employ a method involving previously mixing component (A) and/or component (D) and component (B), and then adding component (C) thereto during an arbitrary step. Further, it is also possible to employ a method involving mixing component (A) and/or component (D) and component (C) beforehand, and then adding component (B) thereto during an arbitrary step.

As a reactive extrusion apparatus for heat-melting the mixture, there can be used a uniaxial extruder, a biaxial extruder, a two stage extruder as a combination of the uniaxial extruder and the biaxial extruder, and the like. In the case of molding by an off-line method of tubular film, adhesive film, fusion-cut shrink film, foamed products, pipes, sheets, boards, blow moldings or injection moldings, the pellets previously produced by the reactive extrusion apparatus can be used. On the other hand, the raw material mixture in which the above three to four components are dry-blended is directly charged into the hopper of the reactive extrusion apparatus, and can be molded immediately by an in-line method. It should be noted that, in the case of the uniaxial extruder, the extruder requires a screw having a specific structure which has a good mixing property and a specific vacuum line so that the resin does not vent up. It is important that the optimal blending composition be selected by taking into consideration the number of steps included in a kneading process and the heating conditions. In the case of the biaxial extruder, the extruder requires a screw structure having a good mixing property and a specific vacuum line so that the resin does not vent up.

EXAMPLES

Hereinafter, the present invention is explained by way of examples and comparative examples. Note that analytical instruments used for measurements of physical properties and measurement conditions are shown below.

(1) The measurement of the molecular weight of a PET resin was performed by a GPC method.

SYSTEM-21 manufactured by Showa Denko K.K., column: (both at sample side and reference side) Shodex KF-606M (2 columns), solvent: hexafluoroisopropyl alcohol, column temperature: 40° C., flow rate: 0.6 ml/min, polymer concentration: 0.15 wt %, detector: Shodex RI-74, molecular weight conversion standard: PMMA (Shodex M-75), and injection volume: 20 μl. Thus, the number average molecular weight Mn and the weight average molecular weight Mw was measured.

(2) Melt flow rate (MFR) was measured in accordance with JIS K 6760, under the conditions of temperature 280° C. and load of 2.16 kg. The flow amount (g/10 minutes) after 6 minutes was adopted.

(3) The measurement of swell was performed by: letting the sample to fall using a melt indexer for MFR under the conditions of temperature of 280° C. and load of 2.16 kg; cutting the sample at the point where length of the flow down sample was 2.0 cm; measuring the diameter of the cut sample at 5.0 mm from the bottom end; and calculating the swell value from the following equation. It should be noted that the diameters were measured several times, and an average value thereof was adopted. Further, the numerical value of "2.095" in the following equation is the inside diameter of the nozzle of the melt indexer for MFR.

$$\text{Swell}(\%)=[(\text{average value of diameter}-2.095)/2.095]\times 100$$

(4) Intrinsic viscosity (IV value) was measured at 25° C. with a Cannon-Fenske viscometer by using a mixed solvent formed of an equivalent weight of 1,1,2,2-tetrachloroethane and phenol.

(5) The measurement of tearing strength was performed in accordance with the method of JIS K 7128-1. To a test film having a width of 50 mm and a length of 150 mm, a slit having a length of 75 mm was made at a center part with a cutter, and thicknesses (mm) of three parts were measured. A T-tearing test was performed at a rate of 200 mm/min and tearing force (N) was measured. The average value of more than five points was adopted.

Examples 1 to 10

Method of Producing Resin Pellets P1 to P10 Each Having High Melt Viscosity with Single Use of Polymeric Polyfunctional Epoxy Compound from Recycled Pet Bottle Flakes To 100 parts by weight (400 g/time in each example, water content: 150 ppm) of recycled PET bottle flakes (Yono PET Bottle Recycle Inc., intrinsic viscosity: 0.73 dl/g, MFR: 56 g/10 min, amount of terminal carboxyl group: 30 mEq/kg) subjected to hot-air drying at 120° C. for 12 hours, which serves as a PET polyester (A), the following were mixed by manual operation in a polyethylene bag: as a polymeric polyfunctional epoxy compound, a predetermined amount of each of B1 (Falpack 200S, manufactured by NOF CORPORATION, PS skeleton, MW 6,000, epoxy equivalent: WPE 148 g/eq., estimated number of functional groups: 41 groups/molecule), B2 (BLEMMER CP-30S, manufactured by same, PS skeleton, MW 9,000, WPE 530 g/eq., estimated number of functional groups: 17 groups/molecule), B3 (BLEMMER CP-50M, manufactured by same, acryl skeleton, MW 10,000, WPE 310 g/eq., estimated number of functional groups: 32 groups/molecule), B4 (BLEMMER CP-505, manufactured by same, PS skeleton, MW 20,000, WPE 310 g/eq., estimated number of functional groups: 65), B5 (Marproof G-01100, manufactured by same, acryl skeleton, MW 12,000, WPE 1,700 g/eq., estimated number of functional groups: 71 groups/molecule), and B6 (Marproof G-2050M, manufactured by the same, acryl skeleton, MW 250,000, WPE 340 g/eq., estimated number of functional groups: 662 groups/molecule); 0.2 part by weight of a calcium stearate/sodium stearate/lithium stearate (weight ratio of 50/25/25) complex as a coupling reaction catalyst; 0.1 part by weight of IRGANOX B225 manufactured by Ciba-Geigy K.K. as a stabilizer; and 0.1 part by weight of liquid paraffin which is a spreader.

A codirectional biaxial extruder manufactured by Technovel Corporation (KZW15-30MG, screw diameter: 15 mm, L/D=30, rotational frequency: 100 rpm, 1-vent type) was used, the preset temperature of the screw and the dies of the extruder was set to be 240 to 280° C., and while vacuuming with a dry-type pump, the flake mixture was loaded into a hopper and was supplied at a predetermined speed with a feeder, to thereby perform reactive extrusion. A strand was extruded continuously from a nozzle having a diameter of 3 mm, which extended obliquely downward, into water at the rate of about 2 m/min, and was cut with a rotating cutter, whereby transparent resin pellets were produced. The hot resin pellets were immediately hot-air dried at 140° C. for 4 hours, and thereafter stored in a moisture-proof bag or a moisture-proof container.

The reaction conditions, the resin numbers, MFR (280° C., load of 2.16 kg), and the like are shown in Table 1. The resin pellets obtained in examples had features in that the resin pellets were controlled to have a high melt viscosity, i.e., MFR of about 0.2 to 25 g/10 min, and that the swell was as large as about 40 to 200%. However, because there were dispersed P1 and P2 each having a macro molecular weight of about 420,000 (200S, 0.6+1×41=41.6), P3 having a macro molecular weight of about 180,000 (CP-30S), P4 to P6 each having a macro molecular weight of about 330,000 (CP-50M), P7 and P8 each having a macro molecular weight of about 670,000 (CP-50S, 2+1×65=67), P9 having a macro molecular weight of about 720,000 (G-01100), and P10 having a supermacro molecular weight of about 6,870,000 (G-2050M, 25+1×662=687) in a matrix of PET as a main material having a molecular weight of about 10,000, the molecular dispersibility was not good, the strand caused melt fracture, and the surface thereof was roughened.

TABLE 1

Production examples of resin pellets each having high melt viscosity with single use of polymeric polyfunctional epoxy compound

| Example | Resin Number | Polymeric polyfunctional epoxy compound | | | | | Blending amount (part(s) by weight) | MFR (g/10 min) | Condition of pellet |
|---|---|---|---|---|---|---|---|---|---|
| | | Code | Trade name | Molecular weight (MW) | Epoxy equivalent (g/eq.) | Number of functional groups (groups/molecule) | | | |
| Example 1 | P1 | B1 | Falpack 200S | 6,000 | 148 | 41 | 1.0 | 0.44 | Pale yellow |
| Example 2 | P2 | B1 | | | | | 2.0 | 0.20 | |
| Example 3 | P3 | B2 | BLEMMER CP-30S | 9,000 | 530 | 17 | 1.4 | 10.3 | Pale yellow |
| Example 4 | P4 | B3 | BLEMMER CP-50M | 10,000 | 310 | 32 | 1.0 | 17.9 | Transparent |
| Example 5 | P5 | B3 | | | | | 1.5 | 3.25 | Pale yellow transparent |

TABLE 1-continued

Production examples of resin pellets each having high melt viscosity with single use of polymeric polyfunctional epoxy compound

| | | | | Polymeric polyfunctional epoxy compound | | | | | |
|---|---|---|---|---|---|---|---|---|---|
| Example | Resin Number | Code | Trade name | Molecular weight (MW) | Epoxy equivalent (g/eq.) | Number of functional groups (groups/molecule) | Blending amount (part(s) by weight) | MFR (g/10 min) | Condition of pellet |
| Example 6 | P6 | B3 | | | | | 2.0 | 0.38 | Pale yellow white |
| Example 7 | P7 | B4 | BLEMMER CP-50S | 20,000 | 310 | 65 | 0.8 | 20.3 | Transparent |
| Example 8 | P8 | B4 | | | | | 2.0 | 0.29 | Pale yellow white |
| Example 9 | P9 | B5 | Marproof G-01100 | 12,000 | 1,700 | 71 | 0.5 | 8.48 | Transparent |
| Example 10 | P10 | B6 | Marproof G-2050M | 250,000 | 340 | 662 | 1.0 | 24.5 | Transparent |

[Note]
MFR: 280° C., load of 2.16 kg

Examples 11 to 16

Method of Producing Resin Pellets P11 to P16 Each Having High Melt Viscosity Subjected to Expansion Control of Molecular Weight Distribution by Polymeric Polyfunctional Epoxy Mixture from Recycled Pet Bottle Flakes To 100 parts by weight (400 g in each example, water content: 150 ppm) of recycled PET bottle flakes (Yono PET Bottle Recycle Inc., intrinsic viscosity: 0.73 dl/g, MFR: 56 g/10 min, amount of terminal carboxyl group: 30 mEq/kg) subjected to hot-air drying at 120° C. for 12 hours, which serves as a PET polyester (A), the following were mixed for 5 minutes, by manual operation in a polyethylene bag: as a polymeric polyfunctional epoxy compound, a predetermined amount of each of BM1 (B2:B3:B5=4:2:1), BM2 (B2:B3:B5=10:3:1), BM3 (B2:B3:B5=20:5:1), and BM4 (B2:B3:B5=100:10:1), which are mixtures each having the composition shown in Table 2; 0.2 part by weight of a calcium stearate/sodium stearate/potassium stearate (weight ratio of 50/25/25) complex as a coupling reaction catalyst; 0.1 part by weight of IRGANOX B225 manufactured by Ciba-Geigy K.K. as a stabilizer; and 0.1 part by weight of liquid paraffin as a spreader.

A codirectional biaxial extruder manufactured by Technovel Corporation (KZW15-30MG, screw diameter: 15 mm, L/D=30, rotational frequency: 100 rpm, 1-vent type) was used, the preset temperature of the screw and the dies of the extruder was set to be 240 to 280° C., and while vacuuming with a dry-type pump, the flake mixture was loaded into a hopper and was supplied at a predetermined speed with a feeder, to thereby perform coupling reaction. A strand was extruded continuously from a nozzle having a diameter of 3 mm into water at the rate of about 2 m/min, and was cut with a rotating cutter, whereby transparent resin pellets were produced. The hot resin pellets were immediately hot-air dried at 140° C. for 4 hours, and thereafter stored in a moisture-proof bag or a moisture-proof container.

The reaction conditions, the resin numbers, MFR (280° C., load of 2.16 kg), and the like are shown in Table 2. The resin pellets of the present invention had features in that the resin pellets were controlled to have a high melt viscosity, i.e., MFR of about 12 to 34 g/10 min, and that, in general, the extrusion molding can be performed stably, which does not cause melt fracture of the strand.

It should be noted that, in Example 13, brand-new PET pellets (Mitsubishi Chemical Corporation, BK2570, IV: 0.78 dl/g, MFR: 45 g/10 min) were used as a PET material, instead of the collected PET bottle flakes. A pellet P13 was produced so that the amount of the terminal carboxyl groups of the brand-new PET as a material became smaller, and hence, the effect of the coupling agent was slightly reduced and the MFR became 23.7, which was twice as large as MFR of 12.7 of the pellet P12 produced in Example 12, which used the recycled PET material.

As a general tendency, the resin obtained from a mixture containing a large amount of a polymeric polyfunctional epoxy compound having a large number of functional groups is suitable for profile extrusion or foam molding. Surprisingly, a mixture BM1, which contains at the highest ratio the polymeric polyfunctional epoxy compound B5 having estimated number of functional groups of as much as 71, had a good molding stability, and a gel or FE was not generated in the pressed film.

TABLE 2

Production examples of resin pellets subjected to expansion control of molecular weight distribution by polymeric polyfunctional epoxy mixture

| | | | Polymeric polyfunctional epoxy compound | | | | | |
|---|---|---|---|---|---|---|---|---|
| Example | Resin Number | Mixture name | Code<br>Trade name<br>Molecular weight<br>Number of functional groups | B2<br>CP30S<br>9,000<br>17 | B3<br>CP50M<br>10,000<br>32 | B5 (Weight ratio)<br>G01100<br>12,000<br>71 | Blending amount (part(s) by weight) | MFR (g/10 min) | Condition of pellet |
| Example 11 | P11 | BM1 | | | 100:50:25 (4:2:1) | | 0.60 | 32.9 | Transparent |
| Example 12 | P12 | BM1 | | | 100:50:25 (4:2:1) | | 0.80 | 12.7 | Transparent |
| Example 13 | P13 | BM1 | | | 100:50:25 (4:2:1) | | 0.80 | 23.7 | Refer to note 2 |

TABLE 2-continued

Production examples of resin pellets subjected to expansion control of molecular weight distribution by polymeric polyfunctional epoxy mixture

| | | | Polymeric polyfunctional epoxy compound | | | | | |
|---|---|---|---|---|---|---|---|---|
| Example | Resin Number | Mixture name | Code<br>Trade name<br>Molecular weight<br>Number of functional groups | B2<br>CP30S<br>9,000<br>17 | B3<br>CP50M<br>10,000<br>32 | B5 (Weight ratio)<br>G01100<br>12,000<br>71 | Blending amount (part(s) by weight) | MFR (g/10 min) | Condition of pellet |
| Example 14 | P14 | BM2 | | | 100:30:10 (10:3:1) | | 0.70 | 33.8 | Transparent |
| Example 15 | P15 | BM3 | | | 100:20:5 (20:5:1) | | 0.70 | 32.3 | Transparent |
| Example 16 | P16 | BM4 | | | 100:10:1 (100:10:1) | | 0.70 | 20.3 | Transparent |

[Note 1] MFR: 280° C., load of 2.16 kg,
[Note 2] brand-new pellets (IV: 0.78 dl/g, MFR: 45 g/10 min) were used as a main material.

Examples 17 and 18

Evaluation Example of Film Molding by in-Line Tubular Method by Using Resin Having High Melt Viscosity which is Subjected to Expansion Control of Molecular Weight Distribution by Polymeric Polyfunctional Epoxy Mixture from Recycled Pet Bottle Flakes and the Like Example 17

To 50 parts by weight (400 g, water content: 150 ppm) of recycled PET bottle flakes (Kyoei Co., Ltd., intrinsic viscosity: 0.73 dl/g, MFR: 65 g/10 min) subjected to hot-air drying at 120° C. for 12 hours, 25 parts by weight (200 g) of brand-new pellets (Mitsubishi Chemical Corporation, intrinsic viscosity: 0.80 dl/g, BK 2170), and 25 parts by weight (200 g) of brand-new high-molecular weight pellets (Italia M&G, intrinsic viscosity: 1.25 dl/g, MFR: 2.0 g/10 min, COBITECH, for foaming), those of which serve as a PET polyester (A), the following were mixed, by manual operation in a polyethylene bag: 0.40 part by weight of a mixture BM5 (B2:B3:B5=1:1:1) as a polymeric polyfunctional epoxy compound; 0.2 part by weight of a calcium stearate/sodium stearate/lithium stearate (weight ratio of 50/25/25) complex as a coupling reaction catalyst; 0.1 part by weight of IRGANOX B225 manufactured by Ciba-Geigy K.K. as a stabilizer; and 0.1 part by weight of liquid paraffin which is a spreader.

To a codirectional biaxial extruder manufactured by Technovel Corporation (KZW15-30MG, screw diameter: 15 mm, L/D=30, rotational frequency: 150 rpm), there were mounted a round die (orifice diameter: 35 mm, lip gap: 0.8 mm), an air-blow machine, and an external air cooling ring having an orifice diameter of 200 mm. The preset temperature of the screw and the dies of the extruder was set to be 240 to 280° C., the flake mixture was loaded into a hopper and was supplied at a predetermined speed with a feeder, to thereby perform coupling reaction. Simultaneously, a film in a tube form was extruded continuously from the round die in a horizontal direction. The blow-up ratio was adjusted, and the film molding by an in-line tubular method was performed while being externally cooled.

The film was transparent and uniform, and gelling or FE was not generated, which demonstrated the excellence of the resin production method of the present invention. The molding of the film having a folded width of about 85 mm (opened width: 170 mm) and a thickness of 40 to 90 μm/2 films (20 to 45 μm in single layer) was remarkably stable. The tearing strength in accordance with the method of JIS K 7128-1 was 48.5 N/mm on average.

Example 18

To 100 parts by weight (300 g, water content: 150 ppm) of recycled PET bottle flakes (Kyoei Co., Ltd., intrinsic viscosity: 0.73 dl/g, MFR: 65 g/10 min) subjected to hot-air drying at 120° C. for 12 hours, 40 parts by weight (120 g) of a dried product of brand-new pellets of PETG (Eastman Chemical Company, Eastar PETG 6763, melting point: absent, MFR at 280° C.: 120 g/10 min, intrinsic viscosity: 0.90), and 20 parts by weight (60 g) of a dried product of brand-new pellets of polyester elastomer (TEIJIN CHEMICALS LTD., NUBELANR4410, TRB-ELA, polyester/PET-base, melting point: 195° C., MFR at 230° C.: 83 g/10 min), those of which serve as a PET polyester (A) (D), the following were mixed, by manual operation in a polyethylene bag: 0.90 part by weight of a mixture BM5 (B2:B3:B5=1:1:1) as a polymeric polyfunctional epoxy compound; 0.2 part by weight of a calcium stearate/sodium stearate/lithium stearate (weight ratio of 50/25/25) complex as a coupling reaction catalyst; 0.1 part by weight of IRGANOX B225 manufactured by Ciba-Geigy K.K. as a stabilizer; and 0.1 part by weight of liquid paraffin which is a spreader.

The film molding by an in-line tubular method was performed in the same manner as in Example 17. The film of this example was transparent and uniform, and gelling or FE was not generated, which further demonstrated the excellence of the resin production method of the present invention.

The molding of the film having a folded width of about 90 mm (opened width: 180 mm) and a thickness of 120 to 130 μm/2 films (60 to 65 μm in single layer) was remarkably stable. The tearing strength in accordance with the method of JIS K 7128-1 was 42 N/mm on average.

Comparative Example 1

Recycled PET bottle flakes (Kyoei Co., Ltd., intrinsic viscosity: 0.73 dl/g, MFR: 65 g/10 min) alone as a PET polyester (A) which is a main material, was subjected to molding under the same conditions, but the film molding was extremely difficult because of its low melt viscosity. The difficult to obtain film of this comparative example was transparent and uniform, but was narrow, thin, and weak with a folded width of about 60 to 65 mm (opened width: 120 to 130 mm), a thickness of 40 to 60 μm/2 films (20 to 30 μm in single layer), and a tearing strength of 32.1 N/mm on average.

Comparative Example 2

Comparative Example 2 was performed in the same manner as in Example 17, except that there were used, as a polymeric polyfunctional epoxy compound, a dry-blended mixture of 50 parts by weight of recycled PET bottle flakes (Kyoei Co., Ltd., intrinsic viscosity: 0.73 dl/g, MFR: 65 g/10 min), 25 parts by weight of brand-new pellets having a middle-molecular weight (Mitsubishi Chemical Corporation, intrinsic viscosity: 0.80 dl/g, BK2170), and 25 parts by weight of brand-new pellets having a high-molecular weight (Italia M&G, intrinsic viscosity: 1.25 dl/g, MFR: 2.0 g/10 min), in which the mixture BM5 was excluded. The moldability was more stable than that of Comparative Example 1, but was less stable than that of Example 17. The film of this comparative example was transparent and uniform, and had a folded width of about 60 to 65 mm (opened width: 120 to 130 mm), a thickness of 60 to 80 μm/2 films (30 to 40 μm in single layer), and a tearing strength of 48.5 N/mm on average. The dry-blending method of this comparative example involves physically expanding the molecular weight distribution of PET, and the molding processability and the tearing strength of the film were clearly improved compared with the film of Comparative Example 1.

Examples 19 to 21

Examples of Film Molding by in-Line Tubular Method by Using Resin Having High Melt Viscosity which is Subjected to Expansion Control of Molecular Weight Distribution by Polymeric Polyfunctional Epoxy Mixture from Recycled Pet Bottle Flakes, Various Polyester Elastomers, and the Like Example 19

Example 19 was performed in the same manner as in Example 18 except that the kind of polyester elastomer was changed to PRIMALLOY manufactured by Mitsubishi Chemical Corporation. To 100 parts by weight (300 g) of recycled PET bottle flakes as a main material, and 40 parts by weight (120 g) of brand-new pellets of PETG (SKC Corporation Korea, SKYGREEN PETG, S2008, melting point: not observed, MFR at 280° C.: 130 g/10 min, intrinsic viscosity: 0.87) and 20 parts by weight (60 g) of brand-new pellets of polyester elastomer (Mitsubishi Chemical Corporation, PRIMALLOY A1500N, melting point: 145° C., MFR at 230° C.: 11 g/10 min), those of which serve as an auxiliary material, the following were mixed, by manual operation in a polyethylene bag: 0.90 part by weight of a mixture MB5 (B2:B3:B5=1:1:1) as a polymeric polyfunctional epoxy compound; 0.2 part by weight of a calcium stearate/sodium stearate/lithium stearate (weight ratio of 50/25/25) complex as a coupling reaction catalyst; 0.1 part by weight of IRGANOX B225 manufactured by Ciba-Geigy K.K. as a stabilizer; and 0.1 part by weight of liquid paraffin which is a spreader.

The film molding by an in-line tubular method was performed in the same manner as in Example 18. The film of this example was pale white, transparent, and uniform, and no gelling or FE was generated. Hence, the resin production method and the molding processability of the present invention were excellent. The film had a folded width of about 100 mm (opened width: 200 mm) and a thickness of 180 to 220 μm/2 films (90 to 110 μm in single layer), and the bubbles were remarkably stable. The tearing strength was 70.1 N/mm on average.

Example 20

Example 20 was performed in the same manner as in Example 18 except that the kind of polyester elastomer was changed to PELPRENE manufactured by TOYOBO CO., LTD. (S-1001, polyester/PBT-base, melting point: 200° C., MFR at 230° C.: 18 g/10 min). In the film molding by the in-line tubular method, bubbles were remarkably stable. The film of this example was transparent and uniform, and no gelling or FE was generated, and hence, the resin production method and the molding processability of the present invention were excellent. The folded width was about 100 mm (opened width: 200 mm), the film thickness was 180 to 200 μm/2 films (90 to 100 μm in single layer), and the tearing strength was 67.0 N/mm on average.

Example 21

Example 21 was performed in the same manner as in Example 18 except that the kind of polyester elastomer was changed to Hytrel manufactured by DU PONT-TORAY CO., LTD. (5007, polyether/PBT-base, melting point: 157° C., MFR at 230° C.: 1.6 g/10 min). In the film molding by the in-line tubular method, bubbles were remarkably stable. The film of this example was transparent and uniform, and no gelling or FE was generated, and hence, the resin production method and the molding processability of the present invention were excellent. The folded width was about 105 mm (opened width: 210 mm), the film thickness was 240 to 270 μm/2 films (120 to 135 μm in single layer), and the tearing strength was 67.6 N/mm on average.

Example 22

Mass Production of Resin Pellets P17 Having High Melt Viscosity which are Subjected to Expansion Control of Molecular Weight Distribution by Polymeric Polyfunctional Epoxy Mixture from Recycled Pet Bottle Parison Crushed Product and the Like, and Example of Film Molding by Tubular Method and Lamination Method To 100 parts by weight of recycled PET bottle parison crushed product (Kyoei Co., Ltd., intrinsic viscosity: 0.78 dl/g, MFR: 45 g/10 min) having a moisture content of 150 ppm after hot-air drying at 120° C. for 12 hours as the component (A), 10 parts by weight of PETG (Eastman Chemical Company, Eastar 6763, MFR: 110 g/10 min) having a moisture content of 100 ppm after hot-air drying at 70° C. for 4 hours as the component (D), and 5 parts by weight of a polyester elastomer (TEIJIN CHEMICALS LTD., reddish brown polyester/PET rubber TRB-ELA) having a moisture content of 120 ppm after hot-air drying at 120° C. for 4 hours as the component (D) also, the following were loaded into a tumbler and mixed for 10 minutes: 0.80 part by weight of a mixture BM5 of a polymeric polyfunctional epoxy compound (NOF CORPORATION, a mixture of: BLEMMER CP-30S: molecular weight 9,000, estimated number of epoxy groups 17 groups/molecule; BLEMMER CP-50M: molecular weight 10,000, estimated number of epoxy groups 32 groups/molecule; and Marproof G-01100: molecular weight 12,000, estimated number of epoxy groups 71 groups/molecule, provided that the weight ratio of the mixture is B2:B3:B5=1:1:1) as the component (B); 0.30 part by weight of mixed powder of lithium stearate, sodium stearate, and calcium stearate (weight ratio 1:1:2) as a reaction catalyst serving as the component (C); 0.1 part by weight of IRGANOX B225 as a stabilizer; and 0.05 part by weight of liquid paraffin as a spreader.

A uniaxial extruder manufactured by Hoshi Plastics Corporation (screw diameter: 65 mm, compression type screw, equipped with four-stage mixing belt, L/D=30, compression scaling ratio: 50, rotational frequency: 100 rpm, 1-vent type) was used, the preset temperature of the screw cylinder was set to be 240 to 280° C. and the preset temperature of the dies was set to be 280° C., and while vacuuming with a dry-type pump, the mixture was loaded into a hopper and was supplied at a predetermined speed with a feeder, to thereby perform reactive extrusion. 5 strands were extruded continuously from the dies into water to be cooled, and were cut with a rotating cutter, whereby transparent resin pellets were produced at a rate of 80 kg/hour. About 500 kg of the thus obtained heat-resistant, heat-sealable resin pellets P17 (MFR: 15 g/10 min) was hot-air dried at 120° C. for 12 hours, and thereafter stored in a moisture-proof bag or a moisture-proof container.

The heat-resistant heat-sealable resin pellets P17 stored in a moisture-proof bag of the present invention were stably formed into a film having a thickness of 25 μm and a folded width of 400 mm and a film having a thickness of 40 μm and a folded width of 400 mm with an air-cooling method, by using an inflation film molding apparatus for polyethylene, and by setting the preset temperatures of the extruder as follows: the cylinder of a uniaxial screw (orifice diameter: 50 mm) to be 240 to 280° C.; and the round type die to be 265 to 280° C. These films were pale yellow, semi-transparent, and uniform, and no gelling or FE were generated, which further demonstrated the excellence of the resin production method of the present invention.

Further, the heat-resistant heat-sealable resin pellets P17 stored in a moisture-proof bag of the present invention were molded by an ordinary lamination apparatus. The pellets P17 were further subjected to moisture absorption and drying for 4 hours, and the resin of this example was extruded by using a uniaxial extruder (orifice diameter: 65 mm) and a T-die having a width of 1,200 mm at a cylinder temperature of 240 to 280° C. and a T-die temperature of 275 to 280° C., thereby laminating the resin on a biaxially stretched PET film (Lumifron, manufactured by Toray Industries, Inc., thickness: 100 μm, width; 1,100 mm, treated product obtained by a corona discharge treatment after used urethane AC agent) at a rate of 60 m/min and a thickness of 20 or 30 μm, the production of which was performed satisfactorily. The adhesive strength between the resin of this example and the biaxially stretched PET film was 320 to 430 g/15 mm width, which was excellent. Further, the heat-seal strengths between the heat-sealed laminated surfaces of the resin of this example were measured from 80 to 230° C. at 10° C. intervals. From 100 to 160° C., the heat-seal strength had increased from 2,000 g/15 mm width to 3,700 g/15 mm width, and from 160 to 230° C., the heat-seal strength had been stable at 3,700 g/15 mm width to 4,000 g/15 mm width. In general, heat-seal strength is sufficient when it is 1,000 g/15 mm width or more.

Comparative Example 3

The same operation was conducted as in Example 22 except that to 100 parts by weight of recycled PET bottle parison crushed product (Kyoei Co., Ltd., MFR: 45 g/10 min) alone as the component (A), 10 parts by weight of PETG (Eastman Chemical Company, Easter 6763, MFR: 110 g/10 min) and 5 parts by weight of polyester elastomer (TEIJIN CHEMICALS LTD., reddish brown polyester/PET rubber TRB-ELA) as the component (D), the following was added: 0.80 part by weight of B3 (BLEMMER CP-50M) alone as a polymeric polyfunctional epoxy compound serving as component (B), whereby about 200 kg of a resin P17C (MFR: 25 g/10 min) having high melt viscosity was produced.

In the same manner as in Example 22, a film having a thickness of 25 μm and a folded width of 400 mm and a film having a thickness of 40 μm and a folded width of 400 mm were molded by using an tubular film molding apparatus for polyethylene in the same conditions as above. However, the bubbles at the time of molding were unstable, and the pale yellow, semi-transparent films were hard and the roughening of the surfaces was notable.

Further, in the molding by the lamination method, the resin P17C of this comparative example was extruded at 280° C. by using the uniaxial extruder (orifice diameter: 65 mm, T-die: 1,200 mm) to try to laminate, in the same manner as in Example 22, the resin with the biaxially stretched PET film (Lumifron, manufactured by Toray Industries, Inc., thickness: 100 μm, width; 1,100 mm, treated product obtained by a corona discharge treatment after used urethane AC agent) at a rolling rate of 60 m/min and a thickness of 20 to 30 μm, but it was impossible to perform the molding under the same conditions as above. When the temperature of the T-die was 280° C., the film crystallized in white color immediately outside of the outlet of the T-die, so lamination was attempted at 300° C. However, the melt tension of the resin of this comparative example was small, and the film broke at the outlet of the T-die. Only a laminate having a thickness of as much as 60 μm at the minimum rolling rate of 10 m/min could be obtained, which could not be used as a commercial product. Thus, in the production of the laminated film, it is extremely important to perform expansion control of the molecular weight distribution of the resin and to increase the melt tension of the resin. However, improvements in those were insufficient in this comparative example.

Examples 23 and 24

Examples of Casting Sheet (0.8 mm Thick) and Board (2 mm Thick), which is Subjected to Expansion Control of Molecular Weight Distribution and has High Crystallization Rate by Polymeric Polyfunctional Epoxy Mixture from Recycled Pet Bottle Flakes and the Like, and Thermo-forming of Heat-Resistant Container by Vacuum Pressure Method Example 23

A sheet (0.8 mm thick) whose crystallization rate is fast and a shallow draw-formed white heat-resistant cup were produced as follows. The following were mixed in a tumbler for 10 minutes: 100 parts by weight (200 kg, water content: 150 ppm) of collected PET bottle flakes (Kyoei Co., Ltd., intrinsic viscosity: 0.73 dl/g, MFR: 65 g/10 min) subjected to hot-air drying at 120° C. for 12 hours as the component (A), 0.15 part by weight of a mixture BM5 (weight ratio B2:B3:B5=1:1:1) serving as a polymeric polyfunctional epoxy compound as component (B); 0.2 part by weight of a calcium stearate/sodium stearate/lithium stearate (weight ratio of 50/25/25) complex serving as a coupling reaction catalyst as component (C); 0.1 part by weight of IRGANOX B225 manufactured by Ciba-Geigy K.K. as a stabilizer; and 0.1 part by weight of liquid paraffin which is a spreader.

To a codirectional biaxial extruder manufactured by IKEGAI CO., LTD. (PCM-40, screw diameter: 40 mm, L/D=30, 3-vent type, rotational frequency: 150 rpm), there were used a T-die (width: 80 mm, lip gap: 1.0 mm), a cooling apparatus, and a rolling-up apparatus. In the extruder, the preset temperature of the screw cylinder was set to be 240 to 280° C. and the preset temperature of the T-die was set to be 280° C., and the flake mixture was loaded into a hopper and supplied at a predetermined speed with a weight feeder, to thereby perform a coupling reaction. Simultaneously, the resultant was extruded continuously from the T-die in a downward direction, and an in-line film (thickness: 0.8 mm) molding was performed while being externally cooled. The sheet of the present invention was transparent and uniform, and no gelling or FE were generated.

Next, FKS-type vacuum air-pressure molding test machine and a female die of a shallow draw-formed cup (orifice diameter: 95 mm, bottom part diameter: 80 mm, depth: 35 mm) manufactured by Asano Laboratories Co. Ltd. were used, and the sheet piece of 40 cm by 40 cm was subjected to vacuum air-pressure molding under the following conditions: the temperature of a quick-response heater was 400 to 600° C.; the temperature of a board surface was 140 to 160° C.; the temperature of a plug was 150 to 170° C.; the temperature of the female die was 150 to 170° C.; the pneumatic pressure was 0.40 MPa; and the time period for mold clamping under vacuum air-pressure was 3 to 5 seconds/shot. The obtained shallow draw-formed cup was white-crystallized at high speed in high-cycle molding by a single molding method of 3 to 5 seconds/shot. It should be noted that the conventional commercially-available C-PET sheet (opaque beige color, 0.5 mm thick) cannot be subjected to molding processing under the conditions of this example, but requires about 8 to 15 seconds/shot for molding, because the molding method is generally a double molding method which uses a molding die and a heat-set die in a two-stage manner, and hence, the productivity is not high.

The degrees of crystallinity measured by DSC were 24% at a side wall part and 24% at a bottom part. The shallow draw-formed white cup maintained the shape thereof in an air heating furnace at 180° C. for 15 minutes, and exhibited heat resistance. The modifier of the present invention substantiated the excellent effect, even with addition of a small amount thereof to the resin, as a crystallization nucleating agent. It should be noted that it was impossible to mold A-PET sheet of the present invention in which the modifier of the present invention is not contained under the molding conditions of this example.

Example 24

A board (2 mm thick) whose crystallization rate is fast, a deep draw-formed transparent heat-resistant cup, and a deep draw-formed white heat-resistant cup were produced as follows. The following were mixed in a tumbler for 10 minutes: 80 parts by weight of an undried product of recycled PET bottle flakes (Kyoei Co., Ltd., intrinsic viscosity: 0.73 dl/g, MFR: 65 g/10 min) and 20 parts by weight of solid-phase polymerized pellets of recycled PET bottles (TAKAYASU Co., Ltd., R1000, intrinsic viscosity: 1.14 dl/g, MFR: 12 g/10 min), 0.15 part by weight of a mixture BM6 (weight ratio of B3:B5=10:1) as a polymeric polyfunctional epoxy compound, 0.2 part by weight of a calcium stearate/sodium stearate/lithium stearate (weight ratio of 50/25/25) complex as a coupling reaction catalyst; 0.1 part by weight of IRGANOX B225 manufactured by Ciba-Geigy K.K. as a stabilizer; and 0.1 part by weight of liquid paraffin which is a spreader.

To a codirectional biaxial extruder manufactured by Hitachi Zosen Corporation (HTM-80, screw diameter: 80 mm, L/D=40, 2-vent type, rotational frequency: 100 rpm), there were used a T-die (width: 1,2000 mm, lip gap: 2.5 mm), a cooling apparatus, and a cutting/take-up apparatus. In the extruder, the preset temperature of a screw cylinder was set to be 240 to 280° C. and the preset temperature of the T-die was set to be 280° C., and the flake mixture was loaded into a hopper and was supplied at a predetermined speed with a weight feeder, to thereby perform a coupling reaction. Simultaneously, the resultant was extruded continuously from the T-die in an obliquely downward direction, and an in-line board (thickness: 2 mm) molding was performed while cooling with a specular roll. There were produced 100 boards (1 m wide×2 m long, thickness: 2 mm) of the present invention, and each of the boards was transparent and uniform, which was glass-like, and a gel or FE was not generated at all.

Next, FKS-type vacuum air-pressure molding test machine and a female die of a deep draw-formed cup (orifice diameter: 64 mm, bottom part diameter: 50 mm, depth: 109 mm) manufactured by Asano Laboratories Co. Ltd. were used, and a board piece of 40 cm by 40 cm obtained by cutting the above board was subjected to a vacuum pressure thermo-forming test under the following conditions, thereby producing experimentally a transparent heat-resistance cup: the upper/lower temperature of a quick-response heater was 500° C./500° C.; the upper/lower temperature of a board surface was 120 to 130° C./100 to 120° C.; the temperature of a plug was 130 to 140° C.; the temperature of the female die was 120 to 130° C.; the pneumatic pressure was 0.50 MPa; and the time period for mold clamping under vacuum air-pressure was 3 to 10 seconds/shot. The thus obtained deep draw-formed cup was transparent-crystallized at high speed in high-cycle molding by a single molding method. The degrees of crystallinity of the transparent cup of this example measured by DSC were 27% at an upper side wall part, 37% at a lower side wall part, and 26% at a bottom part. The modifier of the present invention substantiated the excellent effect, even with addition of a small amount thereof to the resin, as a crystallization nucleating agent.

It should be noted that it was impossible to mold A-PET sheet in which the modifier of the present invention is not contained under the conditions of this example, because the draw-down of the board was intense during heating and the cup was broken during vacuum pressure thermo-forming.

Next, the FKS-type vacuum pressure thermo-forming test machine and a female die of a deep draw-formed cup (orifice diameter: 64 mm, bottom part diameter: 50 mm, depth: 109 mm) manufactured by Asano Laboratories Co. Ltd. were used, and a board piece of 40 cm by 40 cm obtained by cutting the above board was subjected to a vacuum pressure thermo-forming test under the following conditions, thereby producing experimentally a white heat-resistant cup: the upper/lower temperature of a quick-response heater was 500° C./500° C.; the upper/lower temperature of a board surface was 150 to 160° C./130 to 150° C.; the temperature of a plug was 140 to 160° C.; the temperature of the female die was 150 to 170° C.; the pneumatic pressure was 0.60 MPa; and the time period for mold clamping under vacuum air-pressure was 3 to 10 seconds/shot. The thus obtained deep draw-formed cup was white-crystallized at high speed in high-cycle molding by a single molding method. The degrees of crystallinity of the white cup of this example measured by DSC were 30% at an upper side wall part, 29% at a lower side wall part, and 30% at a bottom part. The modifier of the present invention demonstrated the excellent effect, even with addition of a small amount thereof to the resin, as a crystallization nucleating agent. It should be noted that it was impossible to mold A-PET board in which the modifier of the present invention is not contained under the conditions of this example, in the same manner as described above.

Comparative Example 4

A deep draw-formed, white, heat-resistant cup was produced experimentally in the same manner as in Example 24, except that 0.15 part by weight of B3 (BLEMMER CP-50M) alone was used as a polymeric polyfunctional epoxy compound. The cup maintained the shape thereof in a heat-resistance test inside an air heating furnace at 200° C. for 20 minutes, but cracks were generated vertically in two cups out of the four cups obtained from a four-cavity die. It was presumed that the expansion of the molecular weight distribution was insufficient.

Examples 25 to 30

Examples of Modification of Recycled Pet Bottle Flakes and the Like into Resin Having High Melt Viscosity which is Subjected to Expansion Control of Molecular Weight Distribution by Polymeric Polyfunctional Epoxy Mixture, and Production of in-Line Chemical Foamed Product Example 25

The determination of blending ratio of the resin of the present invention and the production of a rigid foamed product were performed by producing a chemical foamed product by a strand-type chemical foaming method. In a codirectional biaxial extruder manufactured by Technovel Corporation (KZW15-30MG, screw diameter: 15 mm, L/D=30, rotational frequency: 100 to 150 rpm), there were used a strand die (orifice diameter: 3 mm, horizontal extrusion), a cooling apparatus including a stainless plate having a thickness of 5 mm, a small air-blow machine for air-cooling, and a basin having a length of 1 m, and a rolling-up machine equipped with a rubber roll. In the extruder, the preset temperature of a screw cylinder die was set to be 240 to 270° C. and the preset temperature of the die was set to be 240 to 250° C. The flake mixture as a material was loaded into a hopper and was supplied at a predetermined speed with a feeder, to thereby perform coupling reaction in the extruder. After that, the resultant was foamed by the foamed gas (mixed gas of carbon dioxide gas and nitrogen gas) generated by the thermal decomposition of a chemical foaming agent, and the foamed strand was extruded continuously from the die having a orifice diameter of 3 mm in a horizontal direction. The foamed product was precooled in the small air-blow machine while sliding the foamed product on the stainless plate wet with water, then cooled in the water contained in the basin, and the hardened strand-shaped foamed bar was wound up at a constant speed by the rolling-up machine equipped with a rubber roll. As the chemical foaming agent, a masterbatch manufactured by Eiwa Chemical Industry Co., Ltd. was used. POLYTHLENE EE201 ($N_2$ gas, 41 ml/5 g, at 275° C.) and POLYTHLENE EE405F ($CO_2$ gas, 330 ml/5 g, at 220° C.) were used in a mixture of 3:2 (mixed gas, 157 ml/5 g).

The following were mixed, by manual operation in a polyethylene bag: 110 parts by weight of a dried product of recycled PET bottle flakes (Kyoei Co., Ltd., intrinsic viscosity: 0.73 dl/g, MFR: 65 g/10 min) and 25 parts by weight of solid-phase polymerized pellets of recycled PET bottles (TAKAYASU Co., Ltd., R1000, intrinsic viscosity: 1.14 dl/g, MFR: 12 g/10 min), those of which serve as a PET polyester (A) as a main material; 0.8 part by weight of a mixture BM5 (B2:B3:B5=1:1:1) as a polymeric polyfunctional epoxy compound serving as a coupling agent (B); 0.3 part by weight of a calcium stearate/sodium stearate/lithium stearate complex as a coupling reaction catalyst (C); 0.1 part by weight of IRGANOX B225 manufactured by Ciba-Geigy K.K. as a stabilizer; 0.1 part by weight of liquid paraffin as a spreader; and 10 parts by weight of the masterbatch, which is the 3:2 mixture, as a chemical foaming agent.

In the above production method, the production was performed at screw rotational frequency of 100 rpm, material feeder rotational frequency of 30 rpm, take up rate of 30 m/min. The resin pressure in the die was 2.9 MPa and the resin temperature was 256° C. The thus obtained strand foamed bar had a diameter of 4.6 mm, a specific gravity of 0.513, and a foaming magnification of 1.6 times. The strand foamed bar of this example was cut to have a length of 25.4 cm, and when both ends thereof were held and the bar was slowly bent, the bar did not break, but, on the other hand, when the bar was rapidly bent, some of the bar broke. The Izod impact strength according to JIS-K7110 method was found to be 11 $KJ/m^2$ (without notch), and hence the impact resistance of the bar was excellent to an extent.

Example 26

The following were mixed, by manual operation in a polyethylene bag: 110 parts by weight of recycled PET bottle flakes (Kyoei Co., Ltd., intrinsic viscosity: 0.73 dl/g) and 25 parts by weight of solid-phase polymerized pellets of recycled PET bottles (TAKAYASU Co., Ltd., intrinsic viscosity: 1.14 dl/g), those of which serve as a main material (A); 40 parts by weight of PETG (SKC Co., Ltd., Korea, S2008) and 30 parts by weight of a polyester elastomer (Mitsubishi Chemical Corporation, A1500N), those of which serve as an auxiliary material (D); 1.5 parts by weight of a mixture BM5 (B2:B3:B5=1:1:1) as a polymeric polyfunctional epoxy compound (B); 0.3 part by weight of a calcium stearate/sodium stearate/lithium stearate complex as a catalyst (C); 0.1 part by weight of IRGANOX B225 manufactured by Ciba-Geigy K.K. as a stabilizer; 0.1 part by weight of liquid paraffin as a spreader; and 15 parts by weight of the masterbatch, which is the 3:2 mixture (EE201 to EE 405F, Eiwa Chemical Industry Co., Ltd.), as a chemical foaming agent.

Example 26 was performed in the same operation as in Example 25. The resin pressure in the die was 2.0 MPa and the resin temperature was 253° C. The thus obtained strand foamed bar had a diameter of 5.3 mm, a specific gravity of 0.590, and a foaming magnification of 2.3 times. The strand foamed bar of this example was cut to have a length of 25.4 cm, and when both ends thereof were held and the bar was slowly or rapidly bent, the bar did not break. The Izod impact strength according to JIS-K7110 method was found to be 17 $KJ/m^2$ (without notch) or 5.5 $KJ/m^2$ (with notch), and many bars did not break when they did not have a notch, and hence were sufficiently excellent in impact resistance.

Example 27

Example 27 was performed in the same manner as in Example 26 except that the composition of materials was changed as follows, i.e., the content of the polyester elastomer was halved to 15 parts by weight: (A) 110 parts by weight of recycled PET bottle flakes and 25 parts by weight of solid-phase polymerized pellets of recycled PET bottles; (D) 40 parts by weight of PETG and 15 parts by weight of a polyester elastomer; (B) 1.5 parts by weight of an MB5 mixture of a polymeric polyfunctional epoxy compound; (C) 0.2 part by weight of a catalyst complex; 0.1 part by weight of IRGANOX; 0.1 part by weight of liquid paraffin; and 15 parts by weight of the chemical foaming agent 3:2 mixture.

The resin pressure in the die was 1.2 MPa and the resin temperature was 258° C. The thus obtained strand foamed bar had a diameter of 8.0 mm, a specific gravity of 0.555, and a foaming magnification of 2.4 times. The strand foamed bar of this example was cut to have a length of 25.4 cm, and when both ends thereof were held and the bar was slowly or rapidly bent, the bar did not break. The impact resistance was sufficiently excellent.

Example 28

Example 28 was performed in the same manner as in Example 26 except that the composition of materials was changed as follows, i.e., the content of the polyester elastomer was reduced by one-thirds to 5 parts by weight and the content of an MB5 mixture was slightly increased to 1.8 parts by weight: (A) 110 parts by weight of recycled PET bottle flakes and 25 parts by weight of solid-phase polymerized pellets of recycled PET bottles; (D) 40 parts by weight of PETG and 5 parts by weight of a polyester elastomer; (B) 1.8 parts by weight of an MB5 mixture of a polymeric polyfunctional epoxy compound; (C) 0.2 part by weight of a catalyst complex; 0.1 part by weight of IRGANOX; 0.1 part by weight of liquid paraffin; and 15 parts by weight of the chemical foaming agent 3:2 mixture.

The resin pressure in the die was 1.7 MPa and the resin temperature was 256° C. The thus obtained strand foamed bar had a diameter of 7.2 mm, a specific gravity of 0.440, and a foaming magnification of 3.1 times. The strand foamed bar of this example was cut to have a length of 25.4 cm, and when both ends thereof were held and the bar was slowly or rapidly bent, the bar did not break. The impact resistance was sufficiently excellent. When the content of the polyester elastomer was reduced to 5 parts by weight, the impact resistance was satisfactory. The foaming molding of this example was remarkably stable owing to the effect obtained by slightly increasing the content of the MB5 mixture to 1.8 parts by weight.

Example 29

Example 29 was performed in the same manner as in Example 28 except that the composition of materials was changed, i.e., the content of PETG was halved to 20 parts by weight. The resin pressure in the die was 1.1 MPa and the resin temperature was 261° C. The thus obtained strand foamed bar had a diameter of 6.4 mm, a specific gravity of 0.459, and a foaming magnification of 2.9 times. The strand foamed bar of this example was cut to have a length of 25.4 cm, and when both ends thereof were held and the bar was slowly bent, the bar did not break, but when the bar was rapidly bent, the bar broke. The impact resistance decreased with the reduction amount of PETG.

Example 30

Example 30 was performed in the same manner as in Example 28 except that the composition of materials was changed, i.e., the content of PETG was further halved to 10 parts by weight. The resin pressure in the die was 1.3 to 1.5 MPa and the resin temperature was 258° C. The thus obtained strand foamed bar had a diameter of 6.8 mm, a specific gravity of 0.451, and a foaming magnification of 3.0 times. The strand foamed bar of this example was cut to have a length of 25.4 cm, and when both ends thereof were held and the bar was slowly bent, the bar did not break, but when the bar was rapidly bent, the bar broke. Thus, the impact resistance of the foamed bar decreased with the reduction amount of PETG. It should be noted that, for comparison, a strand foamed bar was produced only with recycled PET bottle flakes by removing PETG and the polyester elastomer, and the bar had a lowered foaming magnification of about 2 times and was as fragile as a dead branch in a bending test.

Based on this example, a chemical foamed board (thickness: 2 to 4 mm, foaming magnification: 1.5 to 3 times) by a T-die of 300 mm width and a carbon dioxide gas foamed board (thickness: 2 to 6 mm, foaming magnification: 1.5 to 4 times) by a T-die of 750 mm width could be produced.

Example 31

Example of Modification of Brand-New Pet, Polyester Elastomer, and the Like into Resin Having High Melt Viscosity which is Subjected to Expansion Control of Molecular Weight Distribution by Polymeric Polyfunctional Epoxy Mixture, and Production of Off-Line Chemical Foamed Board The following were loaded into a tumbler and mixed for 10 minutes: 100 parts by weight of a dried product of brand-new PET pellets (Mitsubishi Chemical Corporation, intrinsic viscosity: 0.80 dl/g, BK2170) serving as the component (A) as a main material; 5 parts by weight of a dried product of a polyester elastomer (TEIJIN CHEMICALS LTD., reddish brown rubber TRB-ELA) and PBT (Mitsubishi Rayon Co., Ltd., N1100) for promoting crystallization serving as the component (D) as an auxiliary material; 1.25 parts by weight of a mixture BM2 (NOF CORPORATION, a mixture of BLEMMER CP-30S, BLEMMER CP-50M, and Marproof G-01100, provided that weight ratio thereof is B2:B3:B5=10: 3:1) of a polymeric polyfunctional epoxy compound serving as the component (B) as a coupling agent; 0.30 part by weight of mixed powder of lithium stearate, sodium stearate, and calcium stearate (weight ratio thereof is 1:1:2) serving as a reaction catalyst as the component (C); 0.1 part by weight of IRGANOX B225 as a stabilizer; 0.05 part by weight of liquid paraffin as a spreader; 2.5 parts by weight of a chemical foaming agent 3:2 mixture; and 2 parts by weight of a melt tension increasing agent (Mitsubishi Rayon Co., Ltd., METABLEN, A3000).

A sheet molding test apparatus for PET manufactured by SOKEN CO., LTD. (T-die: 250 mm wide, lip gap: 1.5 mm) was used. In a uniaxial extruder (screw diameter: 30 mm, full-flight type screw, L/D=38, rotational frequency: 0 to 100 rpm, no vent), the preset temperature of a screw cylinder was set to be 255 to 270° C., and the preset temperature of the T-die was set to be 255 to 260° C., the mixture was loaded into a hopper and supplied, to thereby perform foaming by a reactive extrusion method.

The screw rotational frequency of the uniaxial extruder was 90 rpm and the resin pressure was 3.4 to 4.8 MPa. A foamed product was continuously extruded from the T-die in a downward direction, cooled with a roll at 70° C. to be formed into a foamed board, and wound up at a take-up rate of 0.4 to 0.6 m/min. The thus produced foamed board had a thickness of 3.3 to 3.4 mm, a width of 250 mm, a specific gravity of 0.61 to 0.75, and a foaming magnification of 1.8 to 2.2 times.

Example 32

Example of Modification of Collected PET Bottle Flakes and the Like into Resin Having High Melt Viscosity which is Subjected to Expansion Control of Molecular Weight Distribution by Polymeric Polyfunctional Epoxy Mixture, and Production of in-Line Carbon Dioxide Gas Foamed Board About 500 kg of the following were prepared and mixed by a tumbler mixer for 10 minutes: 75 parts by weight of collected PET bottle flakes (Yono PET Bottle Recycle Inc., intrinsic viscosity: 0.75 dl/g, MFR: 57 g/10 min, swell: 24%) and 25 parts by weight of solid-phase polymerized pellets of recycled PET bottles (TAKAYASU Co., Ltd., R1000, intrinsic viscosity: 1.14 dl/g), those of which serve as a main material (A); 40 parts by weight of PETG (SKC Co., Ltd., Korea, S2008) and 5 parts by weight of a polyester elastomer (Mitsubishi Chemical Corporation, A1500N), those of which serve as an auxiliary material (D); 1.5 parts by weight of a mixture BM5 (B2:B3:B5=1:1:1) as a polymeric polyfunctional epoxy compound (B); 0.3 part by weight of a calcium stearate/sodium stearate/lithium stearate complex as a catalyst (C); 1 part by weight of CF20E manufactured by Boehringer Ingelheim Co., Ltd. as a foaming nucleating agent; 0.1 part by weight of IRGANOX B225 manufactured by Ciba-Geigy K.K. as a stabilizer; and 0.1 part by weight of liquid paraffin as a spreader.

The mixture of those materials was formed into a carbon dioxide gas foamed board by using equipment for producing a carbon dioxide gas foamed boards. To a biaxial extruder HMT57-40D (codirectionally biaxial, orifice diameter: 60 mm, L/D=40, 2-vent type) manufactured by Hitachi Zosen Corporation, were mounted vacuum equipment, a carbon dioxide gas-injection apparatus, a gear pump, a T-die (width: 1,200 mm, lip gap: 1.3 mm, horizontal extrusion), cooling equipment, and board cutting/take-up equipment. The preset temperature of a cylinder was set to be 260 to 290° C., the preset temperature of the gear pump was set to be 270 to 280° C., and the preset temperature of the T-die was set to be 260 to 270° C. The material mixture was loaded into a hopper and was supplied at 75 kg/h with a weight feeder. Two cases of experiments were carried out by setting the injection rate of carbon dioxide gas to 2.5 g/min and 5.0 g/min, while maintaining the vacuum degree of the 2-vent type cylinder at –0.07 MPa (–500 mmHg) or less and the pressure at the outlet of the gear pump at 10 to 14 MPa, whereby a white flexible foamed board having a width of 1,150 mm was obtained as described below.

|  | Carbon dioxide gas injection rate (g/min) | Thickness (mm) | Specific gravity (under water method) | Foaming magnification (times) |
|---|---|---|---|---|
| Case 1 | 2.5 | 2.5 | 0.52 to 0.61 | 2.2 to 2.6 |
| Case 2 | 5.0 | 2.5 | 0.34 to 0.36 | 3.7 to 4.0 |

INDUSTRIAL APPLICABILITY

In general, in the case of recycling the PET polyester resin collected from the consumer market as a main material, the fields application thereof have been limited because of its inevitable reduction in molecular weight, but the method of the present invention allows the easy restoration of the resin into a polymer having desired molecular weight, molding processability, and physical properties, which contributes largely to the effective utilization of the recycled resources. Further, the method of the present invention can be applied to brand-new PET polyester resins in the same manner, and because, by the present invention, the resins have a macro molecular weight and a molecular weight distribution subjected to expansion control, it becomes possible to produce molding processed products such as tubular film, transparent heat-resistant or white heat-resistant containers obtained from a sheet/board which is crystallized at high speed, foamed bodies, pipes, and profile extrusion products, which have been difficult to produce from conventional PET polyester resins.

On the other hand, by copolymerizing the aromatic alicyclic polyester and the aromatic aliphatic polyester each having a carboxyl group in an aromatic nucleus and using the copolymer as an auxiliary material, the practical application as the following, which have been impossible with the conventional PET polyester resins, has become possible: fusion-cut shrink film, adhesive film, impact-resistant foamed products, and pipes.

The invention claimed is:

1. A method of producing a polyethylene terephthalate graft copolymerized resin, comprising subjecting a mixture to a homogeneous reaction at a temperature of 250° C. or higher to impart a high melt viscosity to the mixture,
the mixture containing (A) 100 parts by weight of a polyethylene terephthalate polyester as a main material, (B) 0.01 to 2 parts by weight of a polymeric polyfunctional epoxy compound containing 17 to 100 epoxy groups on a weight average in a molecule and having a weight average molecular weight of 6,000 to 300,000 as a coupling agent, (C) 0.01 to 1 part by weight of a metal salt of an organic acid as a coupling reaction catalyst, and (D) 0 to 100 parts by weight of an aromatic alicyclic polyester and/or an aromatic aliphatic polyester each having a carboxyl group in an aromatic nucleus as an auxiliary material.

2. A method of producing a polyethylene terephthalate graft copolymerized resin, comprising subjecting a mixture to a homogeneous reaction by a reactive extrusion method at a temperature of 250° C. or higher to set an MFR of the mixture in accordance with a JIS method at 280° C. and under a load of 2.16 kg to 50 g/10 min or less,
the mixture containing (A) 100 parts by weight of a polyethylene terephthalate polyester as a main material, (B) 0.5 to 2 parts by weight of a polymeric polyfunctional epoxy compound containing 17 to 100 epoxy groups on a weight average in a molecule and having a weight average molecular weight of 6,000 to 300,000 as a coupling agent, (C) 0.01 to 1 part by weight of a metal salt of an organic acid as a coupling reaction catalyst, and (D) 0 to 100 parts by weight of an aromatic alicyclic polyester and/or an aromatic aliphatic polyester having a carboxyl group in an aromatic nucleus as an auxiliary material.

3. A method of producing a polyethylene terephthalate graft copolymerized resin according to claim 1, wherein (A) the polyethylene terephthalate polyester as a main material contains one or more kinds chosen from polyethylene terephthalate having an intrinsic viscosity of 0.60 to 1.25 dl/g and a recycled product of a collected polyethylene terephthalate molded product.

4. A method of producing a polyethylene terephthalate graft copolymerized resin according to claim 1, wherein two or more kinds of (B) the polymeric polyfunctional epoxy compounds each containing 17 to 100 epoxy groups on a weight average in a molecule and having a weight average molecular weight of 6,000 to 300,000 as coupling agents are used in combination to perform an expansion control of a molecular weight distribution.

5. A method of producing a polyethylene terephthalate graft copolymerized resin according to claim 1, wherein (C) the metal salt of an organic acid as a coupling reaction catalyst contains one or more kinds chosen from the group consisting of a carboxylate of an alkali metal and a carboxylate of an alkaline earth metal.

6. A method of producing a polyethylene terephthalate graft copolymerized resin according to claim 1, wherein (D) the aromatic alicyclic polyester and/or the aromatic aliphatic polyester each having a carboxyl group in an aromatic nucleus as an auxiliary material contains one or more kinds selected from the group consisting of amorphous ethylene glycol/cyclohexanedimethanol/terephthalate, a polyester elastomer, and a crystalline polybutylene terephthalate, each having a melting point of 220° C. or lower.

7. A method of producing a polyethylene terephthalate graft copolymerized resin according to claim 2, wherein (A) the polyethylene terephthalate polyester as a main material contains one or more kinds chosen from polyethylene terephthalate having an intrinsic viscosity of 0.60 to 1.25 dl/g and a recycled product of a collected polyethylene terephthalate molded product.

8. A method of producing a polyethylene terephthalate graft copolymerized resin according to claim 2, wherein two or more kinds of (B) the polymeric polyfunctional epoxy compounds each containing 17 to 100 epoxy groups on a weight average in a molecule and having a number average molecular weight of 6,000 to 300,000 as coupling agents are used in combination to perform an expansion control of a molecular weight distribution.

9. A method of producing a polyethylene terephthalate graft copolymerized resin according to claim 2, wherein (C) the metal salt of an organic acid as a coupling reaction catalyst contains one or more kinds chosen from the group consisting of a carboxylate of an alkali metal and a carboxylate of an alkaline earth metal.

10. A method of producing a polyethylene terephthalate graft copolymerized resin according to claim 2, wherein (D) the aromatic alicyclic polyester and/or the aromatic aliphatic polyester each having a carboxyl group in an aromatic nucleus as an auxiliary material contains one or more kinds selected from the group consisting of amorphous ethylene glycol/cyclohexanedimethanol/terephthalate, a polyester elastomer, and a crystalline polybutylene terephthalate, each having a melting point of 220° C. or lower.

* * * * *